Patented Dec. 30, 1941

2,267,757

UNITED STATES PATENT OFFICE 2,267,757

PROCESS OF PRODUCING SUBSTITUTED ALPHA-PYRROLIDONES

Curt Schuster, Ludwigshafen-on-the-Rhine, and Alois Seib, Mannheim, Germany, assignors, by mesne assignments, to General Aniline & Film Corporation, New York, N. Y., a corporation of Delaware No Drawing. Application July 11, 1939, Serial No. 283,816. In Germany July 20, 1938

3 Claims. (Cl. 260—313)

The present invention relates to a process of producing substituted alpha-pyrrolidones.

We have found that alpha-pyrrolidones substituted on the nitrogen by alkyl, cycloalkyl, aralkyl or aryl radicles can be prepared by reacting gamma-butyrolactone at elevated temperature in the presence of catalysts splitting off water with primary amines.

There may be used aliphatic amines, as for example methylamine, hydroxyethylamine, isobutylamine, dodecylamine, stearylamine, oleylamine, and also cycloaliphatic amines, as for example cyclohexylamine and abietinylamine, aralkylamines, as for example benzylamine and betaphenylethylamine, and also aromatic amines, as for example aniline, toluidine, anisidine and naphthylamine. The initial materials may be used in equimolecular amounts, or one of the components may be in excess. The presence of diluent gases is frequently of advantage if the reaction be carried out by leading the mixture of the initial materials over the catalyst. The temperature is usually kept between 200° and 400°, especially favorably between 250° and 300° C.

As suitable catalysts capable of splitting off water there may be mentioned for example aluminium oxide in any form, if desired together with activators, and also oxides of thorium, titanium and zirconium, phosphates and borates and silicic acid gel, but the invention is not restricted to the use of these specifically mentioned catalysts. The catalysts may be used in admixture with one another or with other substances, if desired on carriers. The reaction may be carried out at increased or reduced pressure.

The reaction mixture may be worked up by separating the water formed and distilling.

The following examples will further illustrate how the present invention may be carried out in practice, but the invention is not restricted to these examples.

Example 1

A mixture of methylamine and vaporized gamma-butyrolactone is led at 250° C. over a catalyst consisting of a mixture of 95 per cent of aluminium oxide and 5 per cent of thorium oxide. The relative proportions are selected so that 86 grams of butyrolactone and 93 grams of methylamine are used per hour per liter of catalyst. The methylamine recovered by evaporation from the condensed reaction product is used again.

After separating the water formed and the unconverted gamma-butyrolactone, there is obtained by vacuum distillation of the reaction product a good yield of N-methylpyrrolidone in the form of a water-white liquid boiling at from 60° to 65° C. under a pressure of 1 millimeter (mercury gauge).

Example 2

Over a catalyst consisting of dehydrated bauxite there is led at 300° C. a current of nitrogen with which is entrained an equimolecular mixture of aniline and gamma-butyrolactone. The speed of the current of gas and vapor is selected so that 86 grams of butyrolactone and 93 grams of aniline are used per hour per liter of catalyst. The liquefied reaction product is dissolved in a low boiling solvent and freed from the water formed during the reaction. After evaporating the solvent, there is obtained by vacuum distillation a good yield of N-phenyl-alpha-pyrrolidone which boils at 150° C. under a pressure of 1.5 millimeters (mercury gauge).

What we claim is:

1. The process of producing alpha-pyrrolidones substituted on the nitrogen which comprises leading a mixture of gamma-butyrolactone and an amine selected from the class consisting of primary alkyl, cycloalkyl, aralkyl and aryl monoamines at a temperature between 200° and 400° C. under substantially ordinary pressure over a catalyst containing as an essential constituent a substance capable of splitting off water selected from the class comprising silicic acid and the oxides, phosphates and borates of aluminium, thorium, titanium and zirconium.

2. In the process according to claim 1 working at a temperature between 250° and 300° C.

3. The process of producing alpha-pyrrolidones substituted on the nitrogen which comprises leading a mixture of gamma-butyrolactone and an amine selected from the class consisting of primary alkyl, cycloalkyl, aralkyl or aryl monoamines at a temperature between 200° and 400° C. under substantially ordinary pressure over a catalyst containing alumina as an essential constituent.

CURT SCHUSTER.
ALOIS SEIB.